United States Patent
Bernard

(10) Patent No.: US 6,651,515 B2
(45) Date of Patent: Nov. 25, 2003

(54) SENSOR FOR MEASURING AT LEAST ONE PHYSICAL PARAMETER OF A FLUID FLOW, AND IN PARTICULAR A DE-ICED SENSOR OF AIR TOTAL TEMPERATURE

(75) Inventor: Marc Bernard, Saint-Florent-sur-Cher (FR)

(73) Assignee: Auxitrol S.A. (FR)

( * ) Notice: Subject to any disclaimer, the term of this patent is extended or adjusted under 35 U.S.C. 154(b) by 0 days.

(21) Appl. No.: 10/030,695

(22) PCT Filed: May 15, 2001

(86) PCT No.: PCT/FR01/01484
§ 371 (c)(1),
(2), (4) Date: Jan. 14, 2002

(87) PCT Pub. No.: WO01/88496
PCT Pub. Date: Nov. 22, 2001

(65) Prior Publication Data
US 2003/0005779 A1 Jan. 9, 2003

(30) Foreign Application Priority Data
May 15, 2000 (FR) .............................................. 00/06137

(51) Int. Cl.⁷ ................................................. G01F 1/46
(52) U.S. Cl. ................................................... 73/861.65
(58) Field of Search .............................. 73/861.65, 182, 73/204.22

(56) References Cited

U.S. PATENT DOCUMENTS

| 4,268,284 | A | | 5/1981 | Kent et al. |
| 4,644,806 | A | | 2/1987 | Flagg et al. |
| 5,025,661 | A | | 6/1991 | McCormack |
| 5,233,865 | A | * | 8/1993 | Rossow ....................... 73/147 |
| 5,331,849 | A | | 7/1994 | Hedberg et al. |
| 5,653,538 | A | | 8/1997 | Phillips |
| 5,969,266 | A | * | 10/1999 | Mahoney et al. ........ 73/861.65 |

FOREIGN PATENT DOCUMENTS

| EP | 0 835 804 | 4/1998 |
| FR | 2 680 872 | 3/1993 |

* cited by examiner

Primary Examiner—Edward Lefkowitz
Assistant Examiner—Jewel V. Thompson
(74) Attorney, Agent, or Firm—Finnegan, Henderson, Farabow, Garrett & Dunner, L.L.P.

(57) ABSTRACT

A sensor for measuring physical parameters of a fluid, the sensor comprising an air intake fitted on a streamlined body, and a duct formed in said streamlined body to enable the fluid to flow and communicating with said air intake, the sensor being characterized in that said air intake has an inside section that is, at least in part, rounded and fitted on the streamlined body via a surface that is plane.

10 Claims, 3 Drawing Sheets

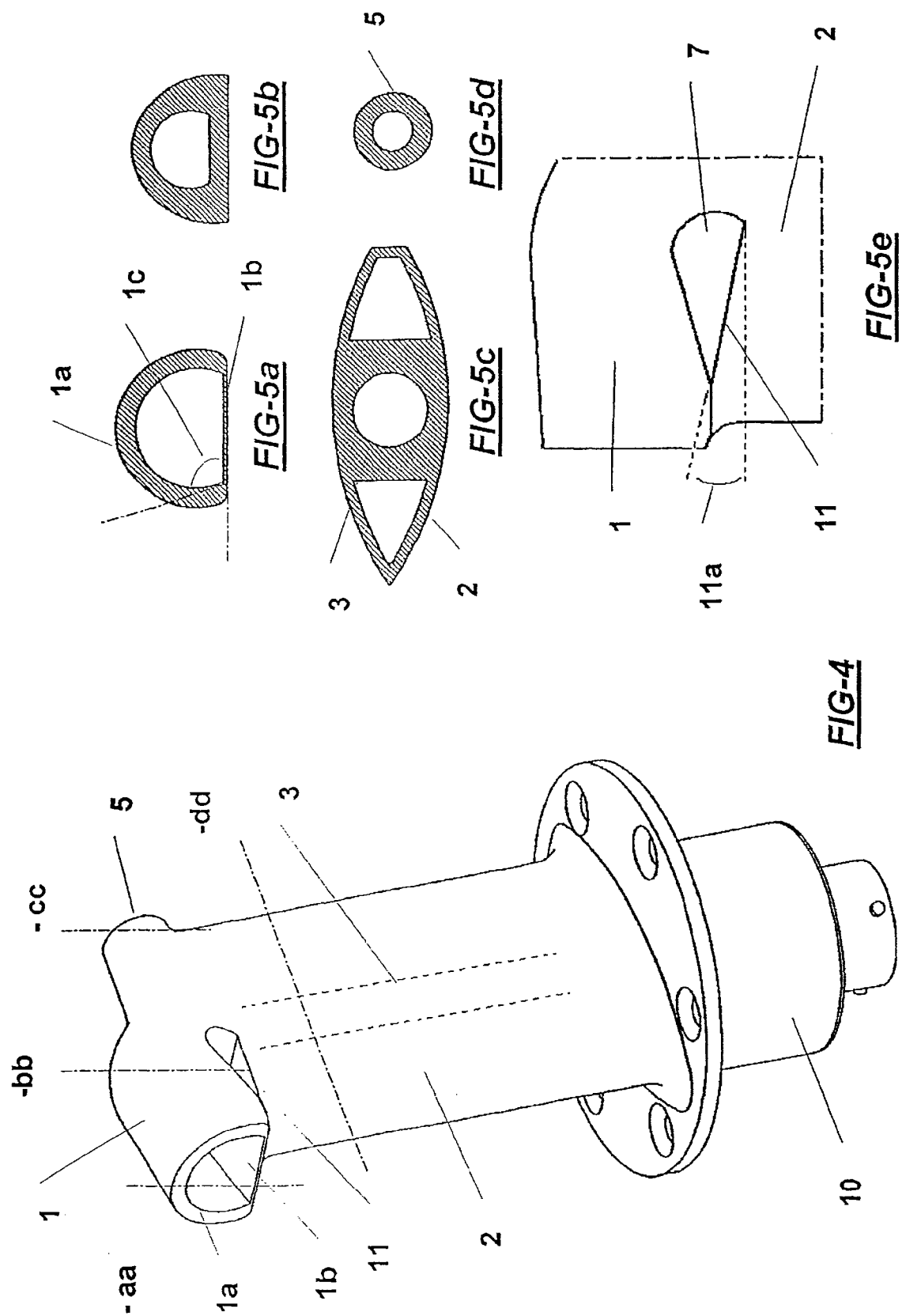

SENSOR FOR MEASURING AT LEAST ONE PHYSICAL PARAMETER OF A FLUID FLOW, AND IN PARTICULAR A DE-ICED SENSOR OF AIR TOTAL TEMPERATURE

CROSS-REFERENCE TO RELATED APPLICATIONS

This application is a national stage application of PCT/FR01/01484, filed May 15, 2001, and claims the benefit of priority of French Patent Application No. 00/06137, filed May 15, 2000.

BACKGROUND OF THE INVENTION

The present invention relates to a sensor for measuring physical parameters of a fluid flow, and in particular a de-iced sensor of air total temperature.

An advantageous application of the invention lies in the field of aviation for measuring the total temperature of the air at the inlet to engines and/or outside aircraft.

Numerous de-iced sensors of air total temperature are already known.

Conventionally, as shown in FIGS. 1 and 2, they comprise an air intake 1 fitted on a streamlined body 2 (having an aircraft wing type profile) in which a duct 3 is provided enabling the fluid to be measured to flow and communicating with the air intakes 1 via an inertial separation zone 4. This zone serves to separate the air into elements of mass that is large compared with that of air (water, frost, sand, . . . ) by centrifuging, these elements being removed from the sensor via an ejection zone 5 opposite to the air intake. In order to avoid phenomena of fluid separation in the inertial separation zone 4, holes 6 are formed through the wall thereof on its side opposite from the ejection zone 5 and in communication with the outside via a chamber 7 which extends transversely across the thickness of the streamlined body 2. The pressure difference that exists between the inside and the outside of the sensor enables the boundary layer to be sucked in through the holes 6.

The assembly comprising the air intake 1, the streamlined body 2, the duct 3, the inertial separation zone 4, and the ejection zone 5 is de-iced electrically by heater resistances positioned in grooves 8 formed in the walls.

An element 9 forming a measurement probe extends inside said duct 3. By way of example, this element 9 can be a platinum wire constituting a thermometer resistance which is thermally insulated from the streamlined body 2.

Measurement error associated with the thermometer resistance protected in a de-iced body conventionally includes heater error (error induced by the de-icing system), recovery error (difference between the measurement and the measured quantity when the heating system is not in operation), self-heating error (induced by the feed to the thermometer resistance), conduction error, radiation error, and response time error. Heating error is, in particular, an error that depends on the shape of the sensor and on the power of the de-icing system.

The various wires forming a thermometer resistance or a heater resistance are connected to a plug connector 10.

Conventionally, as shown in FIG. 2, the air intake 1 is rectangular in section and the same applies, at least in part, to the duct 3 which connects to said air intake.

Also conventionally, the plane 11 supporting the chamber 7 and connecting the streamlined body 2 to the air intake 1 lies parallel to the air flow direction, i.e. perpendicular to the plane supporting the air intake 1.

Sensors of the type shown in FIGS. 1 and 2 need to be capable of operating under particularly severe icing conditions, particularly when they are used in aviation for measuring the total temperature of air.

SUMMARY OF THE INVENTION

The object of the invention is to propose a novel sensor structure that makes it possible to withstand icing conditions that are even more severe than can be withstood by presently known sensors, and to do so without increasing the electrical power used for de-icing, so as to avoid falsifying the measurements of the probe-forming element.

The solution proposed by the invention is a sensor for measuring physical parameters of a fluid, as defined in claim 1.

In particular, the proposed sensor advantageously comprises a streamlined body, a duct formed through said streamlined body to enable the fluid to flow, an inertial separation zone, a particle injection zone, a system for sucking in the boundary layer made up of a chamber and holes interconnecting the inside and the outside of the sensor, and an air intake terminating the body at one end thereof and opening out into the duct, the sensor being characterized in that the air intake is of inside section that is rounded, at least in part.

The duct in the streamlined body is advantageously also of rounded section.

The plane supporting the boundary layer suction chamber and connecting the streamlined body to the air intake forms a non-zero angle with the fluid flow direction.

Other characteristics and advantages of the invention appear further from the following description which is purely illustrative and non-limiting and should be read with reference to the accompanying figures, in which:

This invention will be more fully described with reference to the drawings, in which:

FIG. 4 is a diagrammatic perspective view of a sensor constituting another possible embodiment of the invention.

FIG. 5 shows section views (5a–5e) on lines a—a, b—b, c—c, d—d, and e—e of FIG. 4.

DETAILED DESCRIPTION OF EMBODIMENTS OF THE INVENTION

Figure 1:
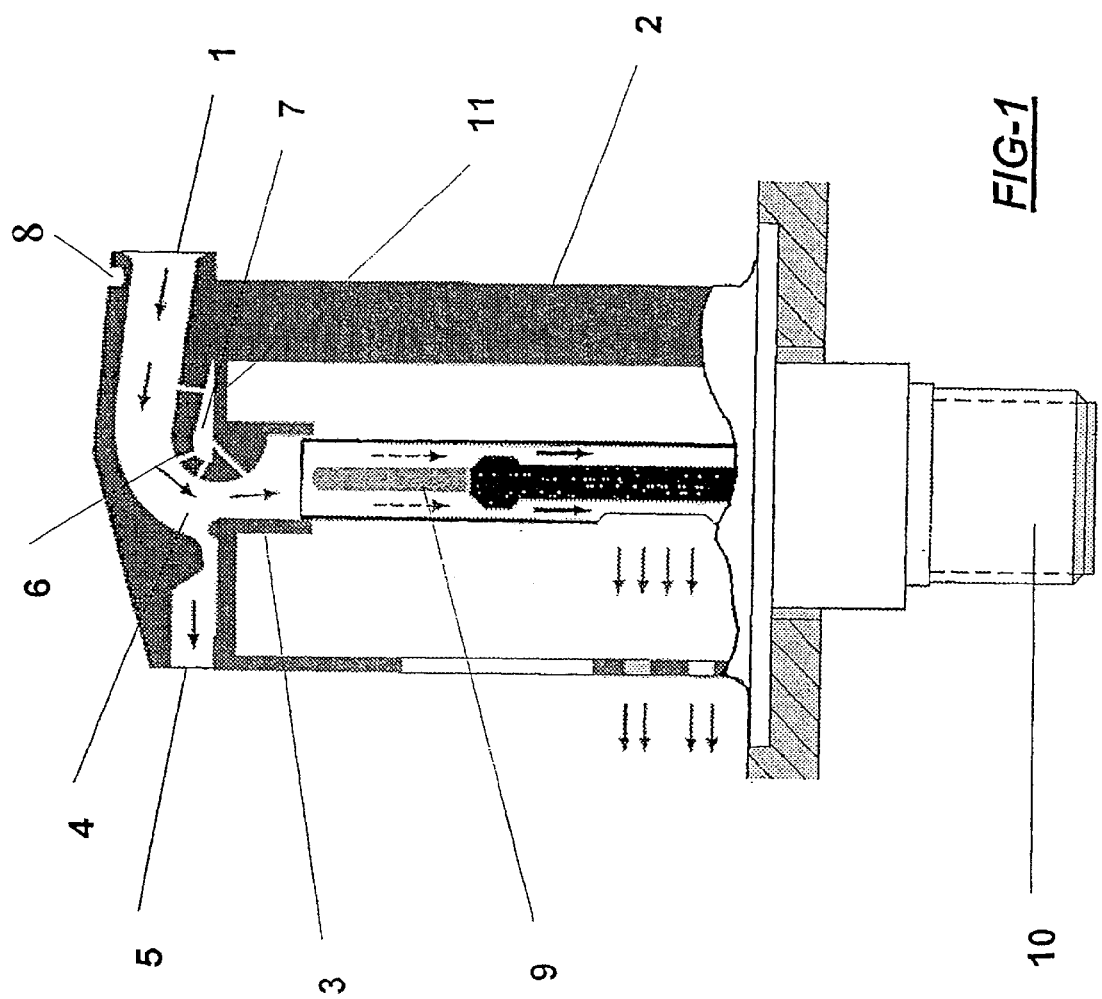
FIG. 1 is diagrammatic section view of a de-iced sensor for measuring air total temperature.
Figure 3:
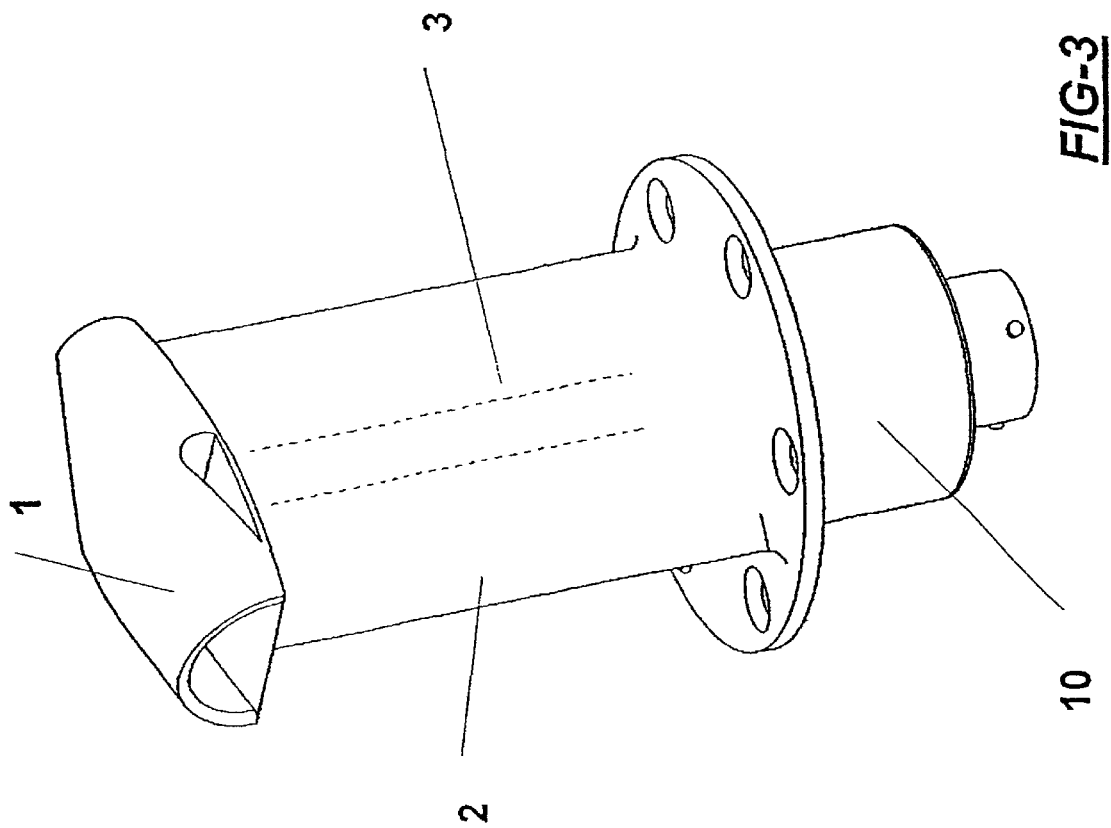
FIG. 3 is a diagrammatic perspective view of a sensor constituting a possible embodiment of the invention.
Figure 2:
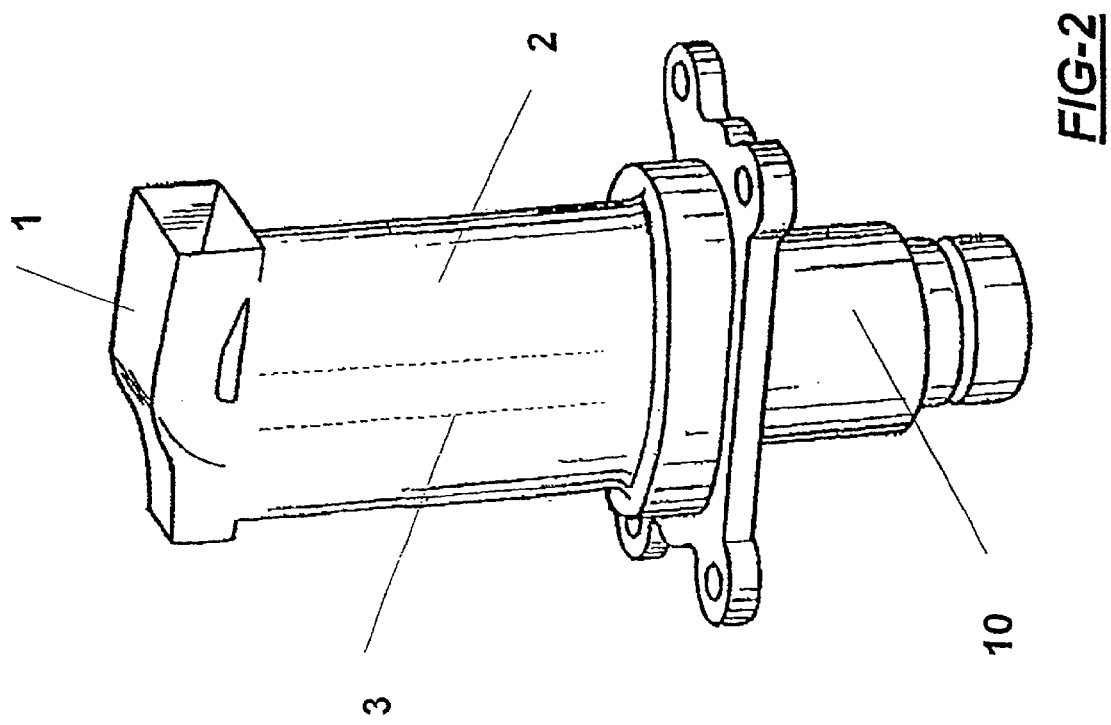
FIG. 2 is a diagrammatic perspective view of a sensor of the type shown in FIG. 1 and forming part of the known art.

Other characteristics and advantages of the invention appear further from the following description which is purely illustrative and non-limiting and should be read with reference to the drawings.

According to the invention, the air intake 1 has an inside section that is rounded, at least in part, and in particular a section that is semicircular or semi-elliptical, instead of being rectangular in section.

Specifically, in the embodiment shown in the figures, the air intake 1 is defined by a portion 1a substantially in the form of a cylinder truncated by a plane surface 1b which extends between the edge of the air intake opening 1 and the inertial separation zone 4.

The boundary layer separation chamber 7 is defined between firstly a wall having one face constituting the plane surface 1b and its other face defining a portion of said chamber 7, and secondly a plane surface 11 which extends to the wall which defines the inertial separation zone 4 from said chamber 7.

This surface 11 is inclined at a non-zero angle 11a relative to the fluid flow direction.

In particular, its angle relative to the air flow direction advantageously lies in the range 5° to 45°.

The height of the air intake is not less than the radius of said cylinder, the portion 1a constituting at least a half-cylinder.

Thus, where the portion 1a in the form of a partial cylinder intersects the bottom 1b, the angle between the tangent of said portion 1a and the bottom 1b is greater than 90° (FIGS. 5a and 5b).

In particular, the height of the cylinder advantageously corresponds to one-and-a-half times the radius of the cylinder.

At the entrance to the air intake 1, the inside radius of the cylinder 1a is 1 centimeter (cm) for example.

The duct 3 which extends inside the body 2 and the ejection zone 5 are likewise of section that is rounded, in particular circular or elliptical (FIGS. 4c and 4d).

The angle 11a between the streamlined body 2 and the air intake 1 is 15°, for example (FIG. 4e).

The use of such a shape for the air intake 1, and also where appropriate for the duct 3 inside the streamlined body 2, makes it possible to reduce the surface area inside the sensor on which ice can become deposited, eliminates the zones where the flow section of the air to be measured changes, and eliminates dead zones that occur in the corners:

for given de-icing power, it makes it possible to withstand icing conditions that are more severe than can be withstood by conventional sensors and to comply with the latest requirements in aviation standards;

under identical icing conditions, the de-icing power required is 10% to 20% less than for prior art sensors;

at identical de-icing power, the measurement error due to the heating system is decreased;

measurement stability in the face of turbulence is improved since the turbulence generated is less than that generated by the air intake shape of conventional sensors; and sensitivity to a variation in the angle of incidence of the air flow to be measured is reduced.

The use of a non-zero angle 11a between the plane surface 11 and the air flow direction makes it possible to optimize the pressure difference that exists between the chamber 7 and the inside of the sensor:

the suction capacity of the holes 6 is increased, in particular their capacity to suck in the water that comes from de-icing the flat bottom 3b; and the behavior of the sensor as a function of the speed of the air flow is improved (the effectiveness of the suction system is conserved over the entire range of flying conditions).

In particular, the sensor as described above makes it possible to take measurements over the entire range of flying conditions that apply to military and to commercial aircraft, for concentrations of moisture or ice of up to 5 grams per cubic meter (g/m$^3$), while consuming power that is identical to that conventionally used, or even less (about 250 watts (W) to 500 W depending on the size of the application).

What is claimed is:

1. A sensor for measuring physical parameters of a fluid, the sensor comprising:
   a streamlined body;
   an air intake fitted on the streamlined body, wherein the air intake has an inside section that is, at least in part, rounded, and wherein the air intake is fitted on the streamlined body via a surface that is plane;
   a duct formed in said streamlined body, wherein the duct comprises a first opening in communication with the air intake and a second opening; and
   at least one probe forming element placed inside the duct, wherein the probe forming element is between the first and second openings, thereby allowing fluid to flow to the probe forming element.

2. A sensor according to claim 1, wherein the air intake is semicircular or semi-elliptical in section.

3. A sensor according to claim 1, wherein the air intake is circular or elliptical in section.

4. A sensor according to claim 1, wherein the duct in the streamlined body is of rounded section.

5. A sensor according to claim 4, wherein the duct in the streamlined body is of section that is circular or elliptical.

6. A sensor according to claim 1, wherein the sensor has a boundary layer separation chamber defined firstly between a wall whose plane surface defines the air intake and secondly a plane surface which extends to a wall defining an inertial separation zone, said plane surface sloping at a non-zero angle relative to the fluid flow direction.

7. A sensor according to claim 6, wherein the angle is from 5° to 45° relative to the air flow direction.

8. A sensor according to claim 1, wherein the probe forming element is a temperature probe-forming element.

9. A sensor for measuring physical parameters of a fluid, the sensor
   a streamlined body;
   an air intake fitted on the streamlined body, wherein the air intake is of a shape defined by a flat bottom and a portion of a cylinder truncated by the flat bottom, and wherein the air intake is fitted on the streamlined body via a surface that is plane;
   a duct formed in said streamlined body, wherein the duct comprises a first opening in communication with the air intake and a second opening; and
   at least one probe forming element placed inside the duct, wherein the probe forming element is between the first and second openings, thereby allowing fluid to flow to the probe forming element.

10. A sensor for measuring physical parameters of a fluid, the sensor comprising:
    a streamlined body;
    an air intake fitted on the streamlined body, wherein the air intake is of a shape defined by a portion of the cylinder and a flat bottom, such that the height of the air intake is not less than the radius of said cylinder, and wherein the air intake is fitted on the streamlined body via a surface that is plane;
    a duct formed in said streamlined body, wherein the duct comprises a first opening in communication with the air intake and a second opening; and
    at least one probe forming element placed inside the duct, wherein the probe forming element is between the first and second openings, thereby allowing fluid to flow to the probe forming element.

* * * * *

UNITED STATES PATENT AND TRADEMARK OFFICE
CERTIFICATE OF CORRECTION

PATENT NO.    : 6,651,515 B2
DATED         : November 25, 2003
INVENTOR(S)   : Marc Bernard It is certified that error appears in the above-identified patent and that said Letters Patent is hereby corrected as shown below:

Column 4,
Line 35, insert -- comprising: -- after "sensor".

Signed and Sealed this

Twenty-fourth Day of February, 2004

JON W. DUDAS
*Acting Director of the United States Patent and Trademark Office*